H. C. KREMERS
R. E. PRICE
INVENTORS.

BY William H Brown

H.C. KREMERS
R.E. PRICE   INVENTOR.

BY
William H. Brown

Patented May 20, 1947

2,420,956

UNITED STATES PATENT OFFICE 2,420,956

OPTICAL BODIES COMPOSED OF SILVER CHLORIDE AND SILVER SULFIDE AND METHOD OF MAKING SAME

Harry C. Kremers, Cleveland Heights, and Robert E. Price, Cleveland, Ohio, assignors to The Harshaw Chemical Company, Elyria, Ohio, a corporation of Ohio Application October 5, 1944, Serial No. 557,356

8 Claims. (Cl. 88—109)

This invention relates to silver chloride optical bodies and specifically to such bodies when modified to prevent or greatly reduce transmission of visible light while permitting transmission of infra-red rays.

Figure 1:
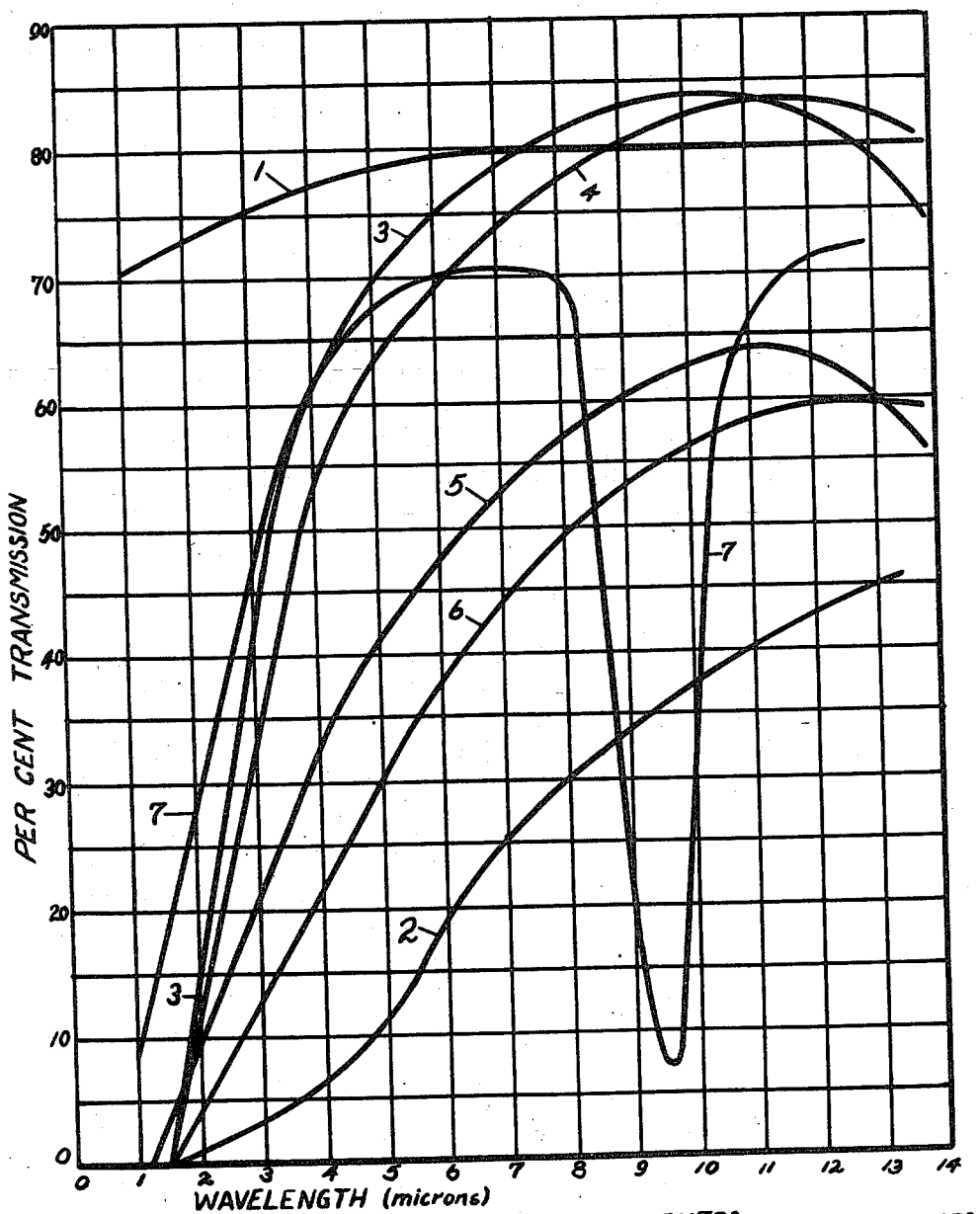

We have discovered that by the incorporation of silver sulfide in silver chloride optical bodies, or by coating silver chloride optical bodies with silver sulfide, we are able to obtain bodies which will transmit infra-red rays to a satisfactory extent while cutting off a sufficient amount of visible light for practical purposes. The degree of transmission varies at different infra-red wave lengths and in accordance with the thickness of the bodies, the amount of silver sulfide incorporated or the thickness of the silver sulfide film, and according to other variable conditions as will be apparent partly from the following description and partly from the accompanying drawing wherein Fig. 1 is a series of graphs of the transmission characteristics of silver chloride bodies, two of the curves representing silver chloride film not containing or coated with silver sulfide, and the other curves being representative of examples of silver chloride film according to the invention.

Figure 2:

In the said drawing Fig. 2 represents a fragmentary cross-section of an optical body composed of silver chloride and silver sulfide intimately associated.

Figure 3:

Fig. 3 represents a fragmentary cross-section of an optical body in the form of a sheet of silver chloride having thereon a coating of silver sulfide.

According to one form of the invention, silver sulfide is incorporated in the silver chloride optical body to the extent of from ½% to 5%. For film of a thickness of the order of one millimeter or less, we prefer to incorporate from 2% to 4% of silver sulfide based on the combined weight of silver chloride and silver sulfide. The incorporation of the silver sulfide may be accomplished in a number of ways. For example, it may be stirred into molten silver chloride at a temperature of 500–600° C.; or the sulfide may be incorporated by coprecipitation with the chloride in proper proportion; or by mixing silver chloride and silver sulfide in finely divided state before melting. Optical bodies so produced and as shown in Fig. 2 wherein 10 represents the bodies, using a proper proportion of sulfide in accordance with the desired thickness, result in adequate transmission of infra-red while eliminating all or nearly all of the visible light.

In Fig. 1 of the drawing, the curve numbered 7 indicates the transmission characteristics of a sample of optical silver chloride film produced by incorporation of the silver sulfide, as just described. It will be noted that there is a sharp cut-off in infra-red transmission in the region from 8 to 11 microns. While this cut-off is useful in some cases as a selective filter, it will frequently be considered undesirable and bodies free of this cut-off will be preferred.

According to another form of the invention, the silver chloride optical body 11 of Fig. 3 is merely coated with silver sulfide 12, and in this case we do not find the cut-off in the region of 8 to 11 microns. The coating may be produced in a number of ways and should preferably be of a thickness to cut off most of the visible light but not much in excess of the required thickness for this purpose since sulfide coatings which are too thick will reduce the infra-red transmission perceptibly in addition to cutting off the visible light. One method of coating is to immerse the optical body in a dilute solution of ammonium sulfide, for example, a solution having a concentration of from ½% to 1½% ammonium sulfide in water. Other sulfides, such as the alkali metal and alkaline earth metal sulfides can be used instead of ammonium sulfide. In the ammonium sulfide dip, the immersion need be for only a few seconds, for example, two or three seconds. The coating may be accomplished also by exposing the optical bodies to hydrogen sulfide gas. The film or other bodies to be coated are exposed to the gas in an enclosed chamber until a coating of the proper thickness has been obtained. The time required with any concentration can be readily determined by cut and try methods until the desired degree of opacity to visible light has been obtained. A satisfactory test for film thickness is to subject the optical body being coated to the gas until the filament of an unfrosted 100-watt bulb is barely perceptible when the body is interposed between the same and the eye of the observer.

In all cases, solarization, by which we mean exposure to sunlight or comparable source of ultra-violet light, has less effect on the infra-red transmission of the coated bodies than of similar bodies which are transparent to visible light. For purposes of comparison, we prefer to solarize by exposure to strong noon day sunlight or a comparable source of ultra-violet light for a period of 1½ hours.

In our work up-to-date we have dealt principally with optical bodies in the nature of film or sheet having a thickness of the order of one millimeter or less, most frequently with sheet having a thickness of about ½ millimeter. In producing sheet of this kind, we prefer to roll the sheet, to an extent not to change its thickness very greatly, after application of the sulfide coating. We find that this gives increased resistance to wear and thereby prolongs the useful life of the film. It is quite possible also to coat the film at a stage when it is still considerably thicker than its final thickness and allow the normal final passes through the rolls to perform the combined function of reducing the film to final thickness and rolling the coating so as to increase its resistance to wear.

Referring to Fig. 1 of the accompanying drawing, the curve numbered 1 represents the infra-red transmission properties of silver chloride film which contains no silver sulfide either as a coating as shown in Fig. 3 or incorporated therein as shown in Fig. 2. In other words, this is the clear untreated optical film which as seen has excellent properties of infra-red transmission but, of course, is also highly transparent to visible light. The curve numbered 2 is comparable to number 1 but indicates a film which has been solarized. It will be obvious from comparison of the two curves that in the case of clear film the solarization very seriously affects the infra-red transmission. The curve numbered 3 indicates the infra-red transmission properties of film coated with silver sulfide by dipping in dilute ammonia solution as described above, while the curve numbered 4 indicates the properties of the film of number 3 after being solarized. It will be obvious from comparison of these curves that solarization has a much less deleterious effect on the coated sheet than on the clear sheet. It will be noted also that the coated sheet compares quite favorably with the clear sheet in infra-red transmission. In curves numbered 5 and 6 we have shown the properties of film produced by gassing with H₂S as described above, the curve numbered 5 indicating the unsolarized film, and the curve numbered 6 indicating the solarized film. The curve numbered 7 indicates, as above mentioned, the characteristics of a film having silver sulfide incorporated therein.

We prefer to carry out our invention in connection with silver chloride optical bodies produced from single crystals of silver chloride or from masses of large crystals thereof, for example, crystals in excess of one cubic-centimeter in volume.

While we have described our invention in connection with certain specific embodiments, we wish it understood that these are but examples of the numerous variations within the scope of the invention.

Having thus described our invention, what we claim is:

1. A solid optical body composed of silver chloride and silver sulfide, said silver sulfide being intimately associated with said silver chloride and being present in approximately that proportion necessary to render said body opaque to visible light, said body being highly transparent to infra red rays.

2. An optical body composed of silver chloride and silver sulfide and being in the form of a sheet, said silver sulfide being intimately associated with said silver chloride and being present in approximately that proportion necessary to render said body opaque to visible light, said body also being highly transparent to infra red rays.

3. An optical body composed of silver chloride and silver sulfide, said body being in the form of a sheet of silver chloride having thereon a coating of silver sulfide of a thickness approximately that required to render said body opaque to visible light, said body also being highly transparent to infra red rays.

4. A solid optical body composed of silver chloride and silver sulfide, said silver sulfide being approximately uniformly distributed through said silver chloride and being present in proportion from ½% to 5% of the combined weight of silver chloride and silver sulfide, said body being highly transparent to infra red rays but opaque to visible light.

5. An optical body in the form of a sheet, the same being composed of silver chloride and silver sulfide, said silver sulfide being approximately uniformly distributed through said silver chloride and being present in proportion from 2% to 4% of the combined weight of silver chloride and silver sulfide, said sheet being of thickness from ½ mm. to 1 mm. and being highly transparent to infra red rays.

6. A sheet composed of substantially pure silver chloride having thereon a coating of silver sulfide of a thickness such that the incandescent filament of an unfrosted 100-watt lamp is barely visible therethrough.

7. An optical body composed of silver chloride and silver sulfide, said body being in the form of a sheet of silver chloride having thereon a coating of silver sulfide of a thickness approximately that required to render said body opaque to visible light, said body comprising at least one deformed crystal of silver chloride of at least 1 cubic centimeter in volume and being highly transparent to infra red rays.

8. A process of producing an optical body composed of silver chloride and silver sulfide intimately associated with each other, such body being highly transparent to infra red rays, said process including the steps of forming a sheet of silver chloride coating said sheet with a coating of silver sulfide of a thickness approximately such as required to render the sheet opaque to visible light and subjecting the so coated sheet to rolling whereby to alter the surface characteristics of said coating and render the same more resistant to wear.

HARRY C. KREMERS.
ROBERT E. PRICE.

REFERENCES CITED

The following references are of record in the file of this patent:

UNITED STATES PATENTS

| Number | Name | Date |
|---|---|---|
| 2,304,900 | Stasiw | Dec. 15, 1942 |

OTHER REFERENCES

Stasiw A. P. C. Publ., Ser. No. 418,502, publ. May 4, 1943.